(12) United States Patent
Borkowski et al.

(10) Patent No.: US 10,509,980 B2
(45) Date of Patent: Dec. 17, 2019

(54) METHOD TO PROVIDE A VEHICLE ENVIRONMENT CONTOUR POLYLINE FROM DETECTION DATA

(71) Applicant: Aptiv Technologies Limited, St. Michael (BB)

(72) Inventors: Dariusz Borkowski, Cracow (PL); Rafal Dlugosz, Poznan (PL)

(73) Assignee: APTIV TECHNOLOGIES LIMITED (BB)

( * ) Notice: Subject to any disclaimer, the term of this patent is extended or adjusted under 35 U.S.C. 154(b) by 71 days.

(21) Appl. No.: 15/799,324

(22) Filed: Oct. 31, 2017

(65) Prior Publication Data
US 2018/0121750 A1    May 3, 2018

(30) Foreign Application Priority Data
Nov. 2, 2016   (EP) .................................... 16196798

(51) Int. Cl.
| G06K 9/46 | (2006.01) |
|---|---|
| G06K 9/00 | (2006.01) |
| G06K 9/62 | (2006.01) |
| G06K 9/52 | (2006.01) |
| G05D 1/02 | (2006.01) |
| G01S 13/89 | (2006.01) |

(Continued)

(52) U.S. Cl.
CPC .............. *G06K 9/4638* (2013.01); *G01S 7/41* (2013.01); *G01S 13/89* (2013.01); *G01S 13/931* (2013.01); *G05D 1/0257* (2013.01); *G06K 9/00791* (2013.01); *G06K 9/00805* (2013.01); *G06K 9/52* (2013.01); *G06K 9/6232* (2013.01); *G06T 9/20* (2013.01); *G01S 13/42* (2013.01); *G05D 2201/0213* (2013.01); *G06K 2209/21* (2013.01)

(58) Field of Classification Search
CPC ............. G06K 9/4638; G06K 9/00791; G06K 9/00805; G06K 9/52; G06K 9/6232; G01S 7/41; G01S 13/89; G01S 13/931; G05D 1/0257; G06T 9/20
See application file for complete search history.

(56) References Cited

U.S. PATENT DOCUMENTS

| 4,783,829 A | 11/1988 | Miyakawa et al. |
|---|---|---|
| 5,335,296 A | 8/1994 | Larkin et al. |

(Continued)

FOREIGN PATENT DOCUMENTS

JP          2940240 B2      6/1999

*Primary Examiner* — David F Dunphy

(57) ABSTRACT

A method of generating a polyline representing a contour of one or more objects includes the steps a) formulating a series of spatially ordered points in 2-dimensional space, each representing a (point) detection with respect to object(s); b) connecting the end points of the series of ordered points with a first straight line segment, and determining the shortest distance between each of the intermediate points and the first segment; c) determining from step b) a threshold based on a measure of the dispersion of the intermediate points around the segment; d) for each side of the segment determining, for any points that lie on that respective side, the point which is further from the segment; e) determining any of the points found in step d) which are further from the segment than the threshold; f) formulating a polyline by connecting the end points of the points determined from step e).

7 Claims, 4 Drawing Sheets

(51) Int. Cl.
*G01S 7/41* (2006.01)
*G06T 9/20* (2006.01)
*G01S 13/42* (2006.01)

(56) References Cited

U.S. PATENT DOCUMENTS

| | | | | |
|---|---|---|---|---|
| 2006/0126965 | A1* | 6/2006 | Song | G06K 9/3275 382/289 |
| 2009/0303026 | A1* | 12/2009 | Broggi | G01S 17/023 340/435 |
| 2010/0195879 | A1* | 8/2010 | Bernhardt | G06T 19/00 382/128 |
| 2013/0202197 | A1* | 8/2013 | Reeler | G01S 17/89 382/154 |
| 2018/0284260 | A1* | 10/2018 | Oyaizu | G01C 3/06 |

* cited by examiner

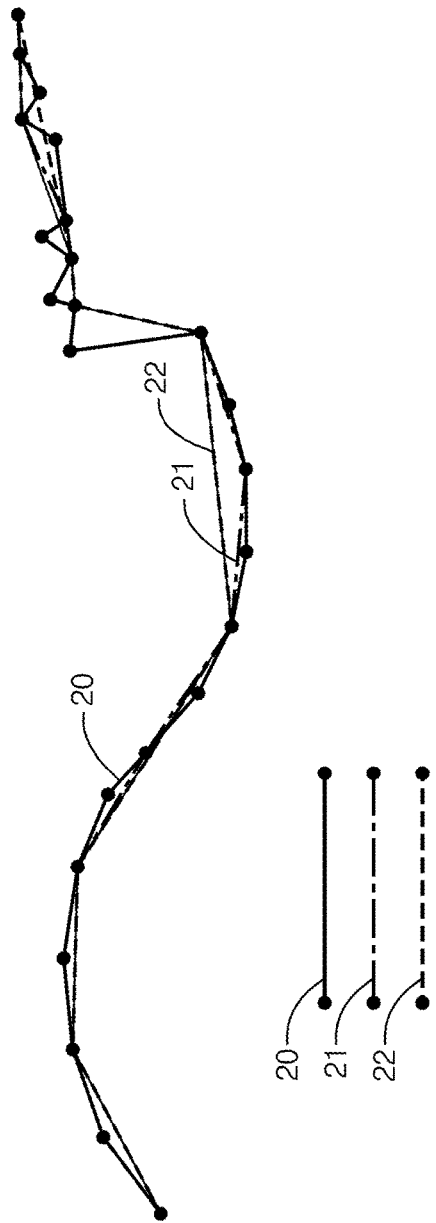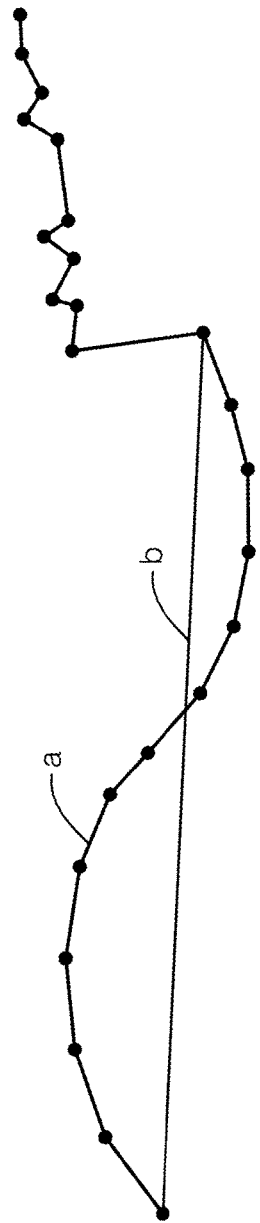
FIG. 2
FIG. 3

METHOD TO PROVIDE A VEHICLE ENVIRONMENT CONTOUR POLYLINE FROM DETECTION DATA

CROSS-REFERENCE TO RELATED APPLICATION

This application claims the benefit under 35 U.S.C. § 119(a) of European Patent Application EP 16196798.9, filed 2 Nov. 2016, the entire disclosure of which is hereby incorporated herein by reference.

TECHNICAL FIELD OF INVENTION

This disclosure relates to techniques to map and characterise the environment (i.e. surroundings) with respect to a vehicle. Aspects therefore relate to determining the real world area in the vicinity of a vehicle, so as to obtain information regarding the environment such as the location of objects such as other vehicles, buildings, obstacles and such like. The invention has particular but not exclusive application to vehicles equipped with radar systems so as to receive data regarding (e.g. point) radar reflections relating to such objects and the environment.

BACKGROUND OF INVENTION

In modern automotive applications, a vehicle may be equipped with one or more systems such as radar systems, which can provide data to the vehicle, pertaining to the environment of the vehicle. Thus the data may be provided from radar detections (reflection data), and used to provide e.g. a 2 dimensional map of objects or the environment in the vicinity of the vehicle. Typically the radar returns give data on the distance to an object of the environment, for a particular planar angle/segment.

Such systems are often required, or part of, modern Advance Driver Assisted Systems (ADAS) where there is a need to describe or characterize the static environment of the host vehicle. Once the environment of the vehicle has been determined or characterized, this enables the vehicle system to determine, e.g. driving options, areas of the environment which are prohibited for motion of the vehicle (i.e., which allows for example determination of obstacles) and to provide information on available parking spaces. So to summarize, in such systems the environment is characterized or defined on the basis of input data from various sensors. In the case of radar based systems, the input data may consist of so called (point) detections, i.e. spatial locations of obstacles, which are detected from reflected waves of sufficient amplitude from a radar system.

The problem of static environment description in ADAS systems is relatively new. Various methodologies are known to provide for the description of the (e.g. dynamic) environment e.g. moving cars, and the use of occupancy grid map methods are known. Such methodologies have been used for the basis of more complex approaches for the description of the vehicle surroundings. As mentioned such systems are used e.g. for automated parking. The definition of the environment relies on determining the shapes (contours) of boundaries of the prohibited areas/obstacles. Theoretically, the simplest way to provide contour data is a direct connecting of consecutive point detections (sorted by azimuth angle) to form a contour comprising a polyline. So such a polyline comprises straight lines joining point detections. The polyline thus is a 2-D representation of obstacles/environment in the horizontal ground plane.

However, taking the factors described above into account, this approach is very inaccurate. In a single radar scan some gaps can occur in the areas that contain flat surfaces. On the other hand, in the areas containing for example plants, bushes, or geometrically complex static structures, the number of detections can be locally increased. Due to limited capacity of automotive communication interfaces like CAN or Flexray, using all detections available in a single scan, is usually impossible. All this causes that there is a high demand for accurate and simultaneously efficient, in terms of computational complexity, algorithms in this area.

It is one object of the invention thus to approximate shapes of static objects in the environment of a vehicle by providing contours thereof, by generation of by polylines (based on sensor detections), which accurately describe shapes and obstacles with respect to the environment using as few points as possible, in a limited time.

SUMMARY OF THE INVENTION

In one aspect is provided a method of generating a polyline representing a contour of one or more objects of a vehicle environment. The polyline includes a series of one or more segments of straight lines, which includes
 a) formulating a series of spatially ordered points in 2-dimensional space, each representing a (point) detection with respect to object(s) in the environment determined by a vehicle on-board detection system;
 b) connecting the end points of the series of ordered points with a first straight line segment, and determining the shortest distance between each of the intermediate points and the first segment;
 c) determining from step b) a threshold based on a measure of the dispersion of the intermediate points around the segment;
 d) for each side of the segment determining, for any points that lie on that respective side, the point which is further from the segment;
 e) determining any of the points found in step d) which are further from the segment than the threshold;
 f) formulating a polyline comprising plurality of segments connecting the end points via any of the points determined from step e).

The method may include providing a revised polyline, comprising:
 g) determining for each segment of the formulated polyline, a threshold based on a measure of the dispersion of the intermediate points of the segment from the segment;
 h) for each segment determining the distance between the segment and each intermediate point of that segment; and determining for each side of the segment, that point, if any, which is the maximum distance from the respective segment,
 i) determining any points found in step h) which lies further from the respective segment than the threshold found from g)
 j) formulating a revised polyline, comprising a series of revised segments, connecting the end points via successive connective points, the connective points being the end points of the segments intermediate of the end points, and any additional points found is step i).

The method may include performing one or more further iterations by repeating steps g) to j) on the revised polyline one or more times.

The iteration may be stopped depending on one or more termination criteria, the termination criteria selected from at least one of the following: maximum number of iterations reached; a maximum processing timeslot exceeded; a maximum number of nodes/points in the determined polyline reached; and no new nodes found in the polyline in the current iteration.

The series of spatially ordered points may represent detections in the horizontal plane with respect to the vehicle, ordered with respect to monotonically increasing or decreasing azimuth angle.

The point detections may be determined from radar reflections reflected from the objects from radar system located on board the vehicle.

The measure of the dispersion of the intermediate points around the segment may be one of the following: the root mean squared distance of intermediate points from the segment; the root mean squared distance of intermediate points from the segment divided by segment length; mean absolute distance of intermediate points from the segment; the mean absolute distance of intermediate points from the segment divided by segment length.

BRIEF DESCRIPTION OF DRAWINGS

The present invention is now described by way of example with reference to the accompanying drawings in which:

FIGS. 2 and 3 illustrate known methodology of forming a polyline;

DETAILED DESCRIPTION

Prior Art

Figure 1:
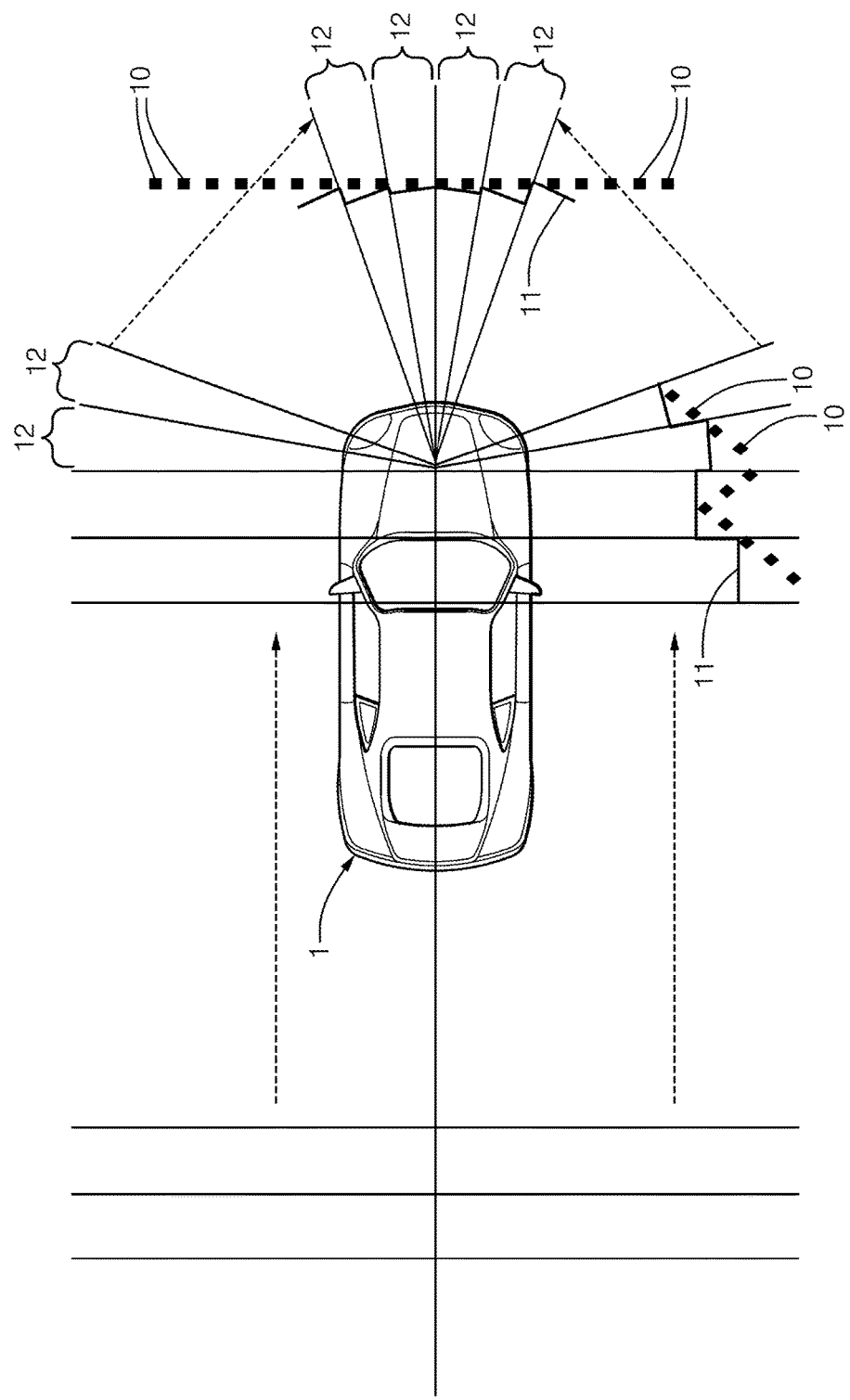
FIG. 1 shows a plan view of a vehicle 1 equipped with a radar system adapted to determine the characteristics of the environment.

A known principle of determining contours of the environment (i.e. providing the shapes of boundaries of the prohibited areas/obstacles) from e.g. radar returns will now be described with reference to FIG. 1. FIG. 1 shows a plan view of a vehicle 1 equipped with a radar system adapted to determine the characteristics of the environment (in the horizontal ground plane) by virtue of (e.g. point) radar reflections 10 which (via e.g. antenna receiver array) are characterized by virtue of their direction and distance (in the ground horizontal plane). The figure shows the environment surrounding a vehicle 1 is divided into narrow radial or rectangular sectors 12 having a quite narrow angle in the forward direction, and designated common origin. In each sector the nearest (e.g. point) detection 10 (e.g. from a radar return) is determined, in other words the distance to the detection is determined from the radar system. So for each sector the space available 11 to the vehicle in the direction associated with that sector can be determined. Such an approach is fast and straightforward, but the accuracy of shape description of static objects is very limited.

This approach according to aspects of the invention can be further modified or enhanced to describe the environment by means of providing an accurate contour or polyline and in a more efficient manner.

So prior art methods such as "Fences" describe the static environment surroundings where obstacles (i.e. objects in the vicinity of the vehicle) are represented by so called contours, which are polylines representing shapes of static objects projected onto the ground plane. In other words obstacles such as building other vehicles and such like are described by contours, represented by a series of one or more straight line (segments). The straight line or segment joins e.g. point detections. Once a set of one or more contours has been determined representing the environment, the ECU can use this data for decision making.

Contours can be thus generated from raw data provided by various types of sensors, such as e.g. radar elements (transmitter and receiver units). Due to measurement method used by radars, the detections are usually somewhat random. The number of detections is limited by two factors: not all obstacles can reflect radar wave sufficiently, etc. (physical factor) and given hardware resources allows for a limited maximum number of detections in a single scan (technological/economical factor). Thus such a straightforward method of generating contours is not ideal.

Thus to recap, the description of the static environment of a vehicle can be characterized by the generation of polylines called contours, which comprise of a series of straight lines joined between points; the points generally representing radar return data. The contours can thus be defined by (x, y) (detection) points called vertices. Location of the vertices are determined and essentially equivalent to the location of confirmed detections. The methodology of the "Fences" algorithms is thus to approximate shapes of static objects by polylines based on sensor detections, which generates the polylines, which accurately describe shapes using as few points as possible, in a limited time.

Prior Art Method 1

A known methodology of forming a contour (polyline) of connecting points (each based on an e.g. point radar return in the horizontal plane), to characterize the environment, will be described with reference to FIG. 2.

Initially a series of consecutive points is obtained based on (point) radar reflections in consecutive angular segments in the horizontal plane. An initial polyline 20 of straight line segments connecting each consecutive point/vertex (reflection) is formed. Initially all these points (within a contour) are marked as "active". In the methodology, the contour is simplified by means of successive interpolation. So initially the contour comprises of a series of lines connecting vertices.

The first step is to reduce the number of connecting points by connecting every second point, depending on certain condition. Points between interpolating lines endpoints are "deactivated" (i.e. not considered) depending on their distances from the interpolating line. This way a revised polyline 21 is produced. If the distance between the examined point and the proposed interpolating line is below a threshold then this point is deactivated and interpolating line with respect to adjacent points (on each side of the point) is adopted as a contour segment. Otherwise, the original segments are left.

In further iterations, again interpolating lines connecting every second active point are proposed to form further revised polyline 22.

The algorithm ends when there are no points deactivated within a given iteration. FIG. 2 shows the plots of the contour initially 20 and after two iterations 21 and 22.

As the method starts from the most detailed shape description (uses all points), it offers very high accuracy of the description. However it does not guarantee limited time of polyline approximation or number of iterations.

Prior Art Method 2

The main disadvantage of the method described above is overcome by contour simplification done in a single pass only. In a further known method, deactivation of a point in is based on the angle between two segments of contour connected in this point. If the angle is wide enough (i.e. two segments are almost co-linear) then the point is deactivated. In other case the point remains active. This is shown in FIG. 3. The original polyline is shown by reference (a) and the refined polyline shown by reference (b).

The main advantage of this approach is a priori known time of the calculations. However, this approach suffers from the fact that it can incorrectly approximate an S or C shapes as a straight line if the angles between consecutive segments are low enough (left part of the contour in the figure. Such approach can incorrectly plot a series of adjacent small variations of segments directions (right part of the contour in the figure.

Example according to one aspect of the Invention

Figure 4A:
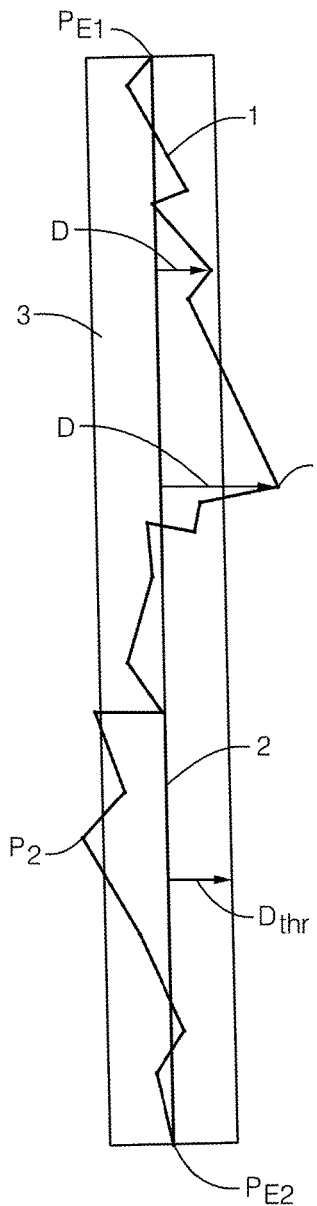
FIGS. 4a, 4b, and 4c illustrate examples according to the invention.

Again as above, input data again is a group of ordered i.e. consecutive (point) detections shown by plot (a) in FIG. 4a. The points may represent successive point reflections from a vehicle radar system from objects in the surrounding environment. The points are ordered in as much as they represent radar reflections in e.g. consecutive angular or spatial segments in the horizontal plane.

Initialization i) The first step is an initialization step where the two endpoints of the group of ordered points are adopted as initial nodes of a single straight line contour, which in further steps is converted to an approximating polyline. So in other words the first step is an approximation which starts with the simplest possible shape i.e. the single segment (shown by reference numeral 2 in FIG. 4a) connecting end points.

ii) Iteration

FIG. 4a shows the steps of a first iteration, which may be repeated in further iterations.

a) In the first iteration step, a measure of dispersion of detections around the segment 2 is determined and used to determine a threshold Dthr. In other words, the threshold is based on the measures of dispersion in terms of the shortest (i.e. perpendicular) distance D between each (intermediate) point and line 2. Examples of how this can be done will be explained hereinafter. The box in the figure represents the threshold.

b) In the next step it is determined for both the left hand side and right hand side of line 2, which point lies the furthest from the line 2. So for the left hand side that point which lies furthest is P2 and for the right hand side that point which lies the furthest from line 2 is P1.

c) In the next step, it is determined if any of the two points found from step b) (P1 and/or P2) lie outside the threshold Dthr found in step a). So in other words the perpendicular distances of each of these points from line 2 is compared to threshold Dthr. If one or both of these points lie outside the threshold they form points of new segments of a revised polyline. Thus in the example, both points P1 and P2 lie outside the threshold distance (Dthr) and become the points of a new polyline seen in FIG. 4b. The revised polyline thus comprises three segments 4a, 4b, and 4c, as seen in FIG. 4b.

If only one point (left or right hand side) is found which lies outside the threshold then only that point forms the vertex (point) of a new polyline formed of two segments or lines (joining the endpoints) via that point. If no points are found that lie outside the threshold, the process finishes.

The process steps of the iteration ii) above may repeated one or more times, In other words steps a), b) and c) may be repeated, for each segment found in the revised polyline.

Figure 4B:
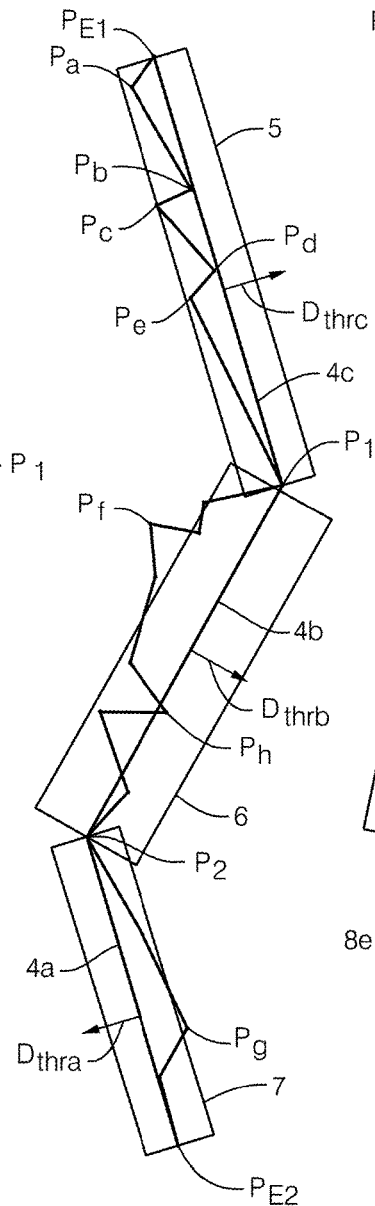

In the example, FIG. 4b shows a further (second) iteration. The process above with respect to ii) is thus repeated. So again, for each segment of the new (approximating polyline) a measure of dispersion of detections around the segment is calculated. This is used to calculate a threshold for each segment; so for segments 4a, 4b and 4c, new thresholds Dthra, Dthrb and Dthrc are calculated respectively. So for segment 4c, a measure of the dispersion of points Pa Pb Pc Pd and Pe from line 4c is determined, and used to calculate Dthrc. Examples of how this is implemented will be explained hereinafter. The thresholds for each segments 4a 4b and 4c are represented also by boxes 7, 6 and 5 respectively.

Again in line with step b) in the first iteration, for each segment (4a, 4b, and 4c) and for each side of the segment, (left hand side and right hand side) the point with the maximum distance from the respective segment is determined.

Again in line with step c) for each of (any of) these points, (if found) of maximum distance on left and right hand sides) it is determined whether the point lies further from the segment than the respective threshold. If any of the max points lies outside the threshold, it forms the basis of a new point for a segment in a revised polyline. So in summary if the distance between segment and the maximum detection found for each side is greater that the dispersion value then the detection will become a new node of the approximating polyline in next iteration.

In the example as seen in FIG. 4b, for segment 4a, for the right hand side, the point with the maximum distance from the line is point Pg; this will form the basis of a new segment in the revised poly line (see FIG. 4c) as this is distance is larger than the threshold (dispersion measure) Dthra for segment 4a. There are no points found on the left hand side of this segment. Thus for segment 4a, in the revised polyline this is effectively divided into two sub-segments: 8f (joining end point PE2 to Pg) and 8e (joining Pg to P2).

Figure 4C:
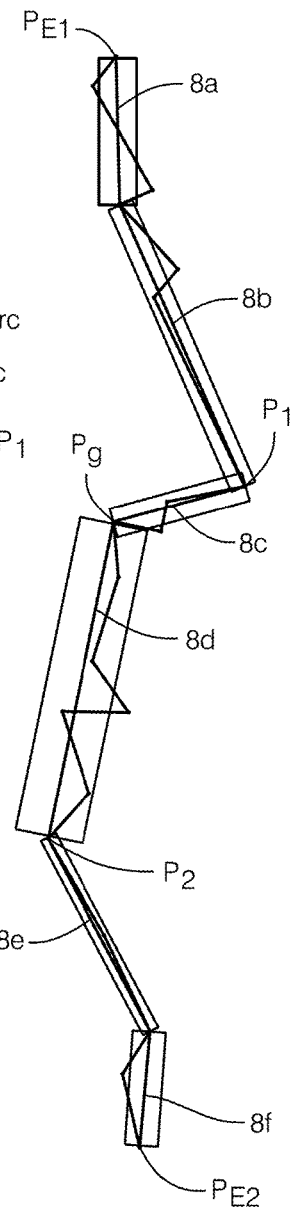

For segment 4b the point of maximum distance on the right-hand side is Pf; this is greater than the threshold distance for that segment Dthrb and so will form a point on the new polyline (FIG. 4c which can be subject of a further third iteration). For the right hand side the point of maximum distance from the segment is Ph—this point lies within the threshold Dthrb and so will not form the basis of a new polyline. Thus segment 4b in the new polyline is refines as two segments 8d and 8c (joining points P2-Pf and Pf-P1 respectively). For segment 4c the maximum distance with respect to the left hand side is Pc—this is more than the threshold for this segment Dthrc and so will form a point and thus the basis for a new segment in the revised polyline of FIG. 4c. There are no points found on the right-hand side. Thus in the revised polyline, segment 4c is converted to sub-segments 8b and 8a joining points P1-Pc and Pc to PE1 respectively.

Of course it may be that points are found both sides of a particular segment which are greater distance away from the segment than the threshold for that segment—in this case both points will form the basis of revised polyline with new segments. In this case the particular segment of the poly line with form three new segments of a revised polyline.

The steps may be repeated in further iterations. The number of iterations may be determined by one or more termination criteria. If the termination criterion is not fulfilled then a further iteration is implemented. If the termination criterion is fulfilled then the process will be stopped, so when the iterations are stopped may be dependent on a particular termination criterion. The skilled person would understand that the process may be terminated depending of various criteria such as: maximum number of iterations exceeded; the time out for further computations in a current time slot; maximum number of nodes in approximation polyline exceeded; or no new nodes in the polyline in the current iteration.

As far as the dispersion criteria regarding determination of the threshold for each segment, the skilled person would understand there may be various ways in determining these. These may include any of the following: the root mean squared distance of detections from the segment; the root mean squared distance of detections from the segment divided by segment length; mean absolute distance of detections from the segment; and the mean absolute distance of detections from the segment divided by segment length.

Figure 5:
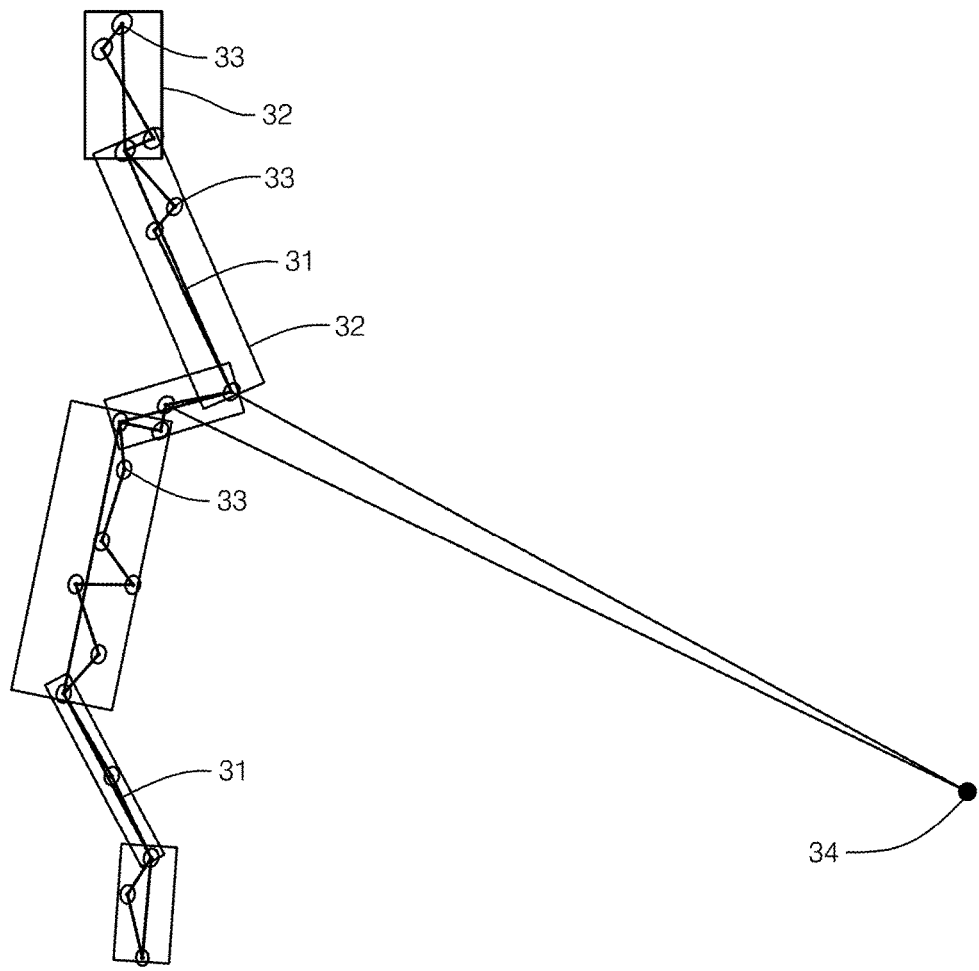
FIG. 5 illustrates how the degree of uncertainty of results may be determined.

After examples of the methodology, a degree of uncertainty may be calculated. This will be described with respect to FIG. 5. For each final segment 31 an uncertainty region can be stated and defined as a rectangle 32 (black dashed lines in the figure) including all detections belonging to the segment. The rectangle is parallel to the segment, and centered by the segment. Its size is defined by the spread of detections belonging to this segment. Thus distance between the segment and the point furthest from the segment will be half the width of the box 32. In addition this can be extended by individual uncertainties shown for example in FIG. 5, by ellipses 33 of azimuth and range uncertainties of detections centered on the detection. The uniform probability density of detections positions within the rectangle is assumed. It is thus possible that uncertainty region will be longer than the segment to include each detection belonging to the segment. The position of the sensor e.g. radar detector is shown by reference numeral 34.

The order of detections is usually given by a monotonically increasing or decreasing azimuth angle. The order of detections through iterations may remain unchanged. During iterations detections are marked as active (nodes of polyline) or inactive (not used for polyline definition).

Methodology according to aspects of the invention provides a flexible control of a compromise between simplicity and accuracy of the approximation. Time for the approximation can be controlled. Further good shape description can be provided with a low number of nodes.

We claim:

1. A method of generating a polyline representing a contour of one or more objects of a vehicle environment, said polyline comprising a series of one or more segments of straight lines, said method comprising:
    a) formulating a series of spatially ordered points in 2-dimensional space, each representing a point detection with respect to one or more objects in said environment determined by a vehicle on-board detection system;
    b) connecting the end points of said series of ordered points with a first straight line segment, and determining a shortest distance between intermediate points and the first straight line segment;
    c) determining from step b) a threshold based on a measure of the dispersion of the intermediate points around said first straight line segment;
    d) for each side of said first straight line segment determining, for any points that lie on that respective side, which point is furthest from said first straight line segment;
    e) determining any of the points found in step d) which are further from the first straight line segment than said threshold;
    f) formulating a 2-dimensional polyline comprising plurality of straight line segments connecting the end points via any of said points determined from step e); and
    determining an uncertainty region based on distance between the segment and the point furthest from the segment.

2. The method as claimed in claim 1 including providing a revised polyline, comprising:
    g) determining for each straight line segment of said formulated 2-dimensional polyline, a threshold based on a measure of the dispersion of the intermediate points of said segment from said segment;
    h) for each of said straight line segments, determining the distance between the segment and each intermediate point of that segment; and determining for each side of said straight line segment, that point, if any, which is the maximum distance from the respective segment,
    i) determining any points found in step h) which lie further from the respective straight line segment than said threshold found from g)
    j) formulating a revised polyline, comprising a series of revised straight line segments, connecting the end points via successive connective points, said connective points being the end points of the straight line segments intermediate of the end points, and any additional points found is step i).

3. The method as claimed in claim 2 including performing one or more further iterations by repeating steps g) to j) on said revised polyline one or more times.

4. The method as claimed in claim 3 where iteration is stopped depending on one or more termination criteria, said termination criteria selected from at least one of the following: maximum number of iterations reached; a maximum processing timeslot exceeded; a maximum number of points in the determined polyline reached; and no additional points found in the polyline in the current iteration.

5. The method as claimed in claim 1, wherein said series of spatially ordered points represent detections in the horizontal plane with respect to the vehicle, ordered with respect to monotonically increasing or decreasing azimuth angle.

6. The method as claimed in claim 1, wherein said point detections are determined from radar reflections emitted from a radar system located on board said vehicle, and reflected from said one or more objects, and detected by said radar system.

7. The method as claimed in claim 1, wherein said measure of the dispersion of the intermediate points around said straight line segment is one of the following: the root mean squared shortest distance of intermediate points from the straight line segment; the root mean squared shortest distance of intermediate points from the straight line segment divided by straight line segment length; mean absolute shortest distance of intermediate points from the straight line segment; the mean absolute shortest distance of intermediate points from the straight line segment divided by straight line segment length.

* * * * *